April 25, 1933.  H. EWEST ET AL  1,905,831
GASEOUS ELECTRIC DISCHARGE DEVICE
Filed July 9, 1929
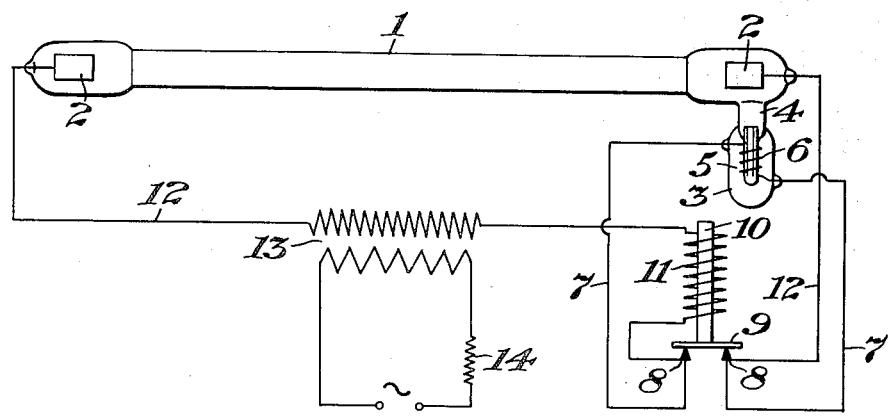
INVENTORS.
HANS EWEST,
MARCELLO PIRANI,
BY Charles E. Mullen
THEIR ATTORNEY.

Patented Apr. 25, 1933

1,905,831

UNITED STATES PATENT OFFICE

HANS EWEST, OF BERLIN, AND MARCELLO PIRANI, OF BERLIN-WILMERSDORF, GERMANY, ASSIGNORS TO GENERAL ELECTRIC COMPANY, A CORPORATION OF NEW YORK

GASEOUS ELECTRIC DISCHARGE DEVICE

Application filed July 9, 1929, Serial No. 377,009, and in Germany July 17, 1928.

The present invention relates to gaseous electric discharge devices.

It is known, that the yellowish red gas discharge from neon filled electric light tubes can be changed from the aforesaid to carmine red or to a red violet discharge by a small addition of hydrogen, namely 0.1% of hydrogen to a neon filling of 1 to 10 mm. pressure. This light color of the gas discharge cannot be maintained for long, however, as the small quantity of hydrogen is quickly used up in the electric discharge. Also it is known that this light color of the gas discharge could not be maintained by the hitherto known means of automatic feeding with hydrogen, such known means as the regulation of the flow of gas by mounting on the current circuit an automatic floating valve; then also the direct mounting of hydrogen evolving substance in the light tube or in an offset chamber of same and by the operation of the gas discharge or a heating means to decompose the substances instantly, in which case, a more than adequate amount of hydrogen was given off in the light tube, so that the light intensity then changed to give off a dim gray-violet light color.

The object of this invention is to produce an extremely long lasting hydrogen feeding means, and one by which the risk of an overfeeding of the light tube with hydrogen and the consequent changing of the desired red-violet light color of the gas discharge is avoided. To this end the invention consists of a dividing body, made of a material, such as palladium, pervious to hydrogen only when heated, attached or set into a binding and attaching support between the light tube and a hydrogen containing offset chamber of the tube. This dividing body remains dormant during the operation of the tube at a predetermined value of the current, at which point the current is not high enough to put the heating means in the circuit. As soon as the hydrogen pressure drops the current of the light tube rises to a predetermined value, in which case, however, the light color of the discharge does not change, as the heating means of the dividing body is then started by the operation of an electromagnet attached in series to the tube circuit. This effectuates the heating of the dividing body which then allows a proper amount of the hydrogen to enter the light tube. This diffusion lasts only until equilibrium is again established so that an overfeeding of the hydrogen cannot take place. It stops as soon as the hydrogen in the tube reaches its normal quantity. Instantly, when this takes place the heating means is shut off by the lowering of the current flowing. Thereafter the dividing body again becomes cold in which condition it prevents the feeding of hydrogen. In the drawing is shown a light tube 1, containing a filling of neon gas of 1 to 10 mm. pressure, with a small percentage of hydrogen (about 0.1% of the quantity of neon gas), and having mounted thereon, in the well known manner, internal electrodes 2 or likewise outer electrodes. To the light tube 1 is attached a chamber 3, that is charged with a suitable quantity of hydrogen material. In the connecting part 4 between the light tube 1 and the offset chamber 3 is sealed a tube 5, that is attached on the chamber 3 and leads off from the light tube. The tube 5 in this dividing body between the light tube and the chamber 3 is made of a material, as palladium, pervious to hydrogen only when heated. The tube 5 is surrounded by a heating wire, 6, which is connected to the contacts 8 by the leads 7. These contacts 8 are, as is customary, bridged by a conducting plate 9 attached to an electro-magnet 10—11 which in turn is connected by the lead 12 to the secondary of the transformer 13 in series with the tube electrodes 2, 2. The primary winding of the transformers 13 is, as shown, attached to a resistance 14.

As soon as the current density of the tube goes over a predetermined value through the loss of hydrogen pressure in the tube, the electro-magnet 10—11 is energized and thereby puts the heater wire 6 in the circuit. This starts heating the tube 5 and then the contained hydrogen in chamber 3 is caused to diffuse gradually into the gas filling of the tube 1.

Therefore, as the hydrogen is not kept back when the dividing tube 5 is heated, a seepage starts into the light tube filling, as most naturally, the hydrogen contained in chamber 3 is under a higher pressure than the tube filling. When the hydrogen component in the light tube, by the diffusion, again reaches a normal pressure, the resumption of nominal current conditions in the tube 1 causes the electro-magnet to fall back again into normal position cutting the heating wire 6 out of the circuit.

The hydrogen controlling dividing body can be placed in other positions and in other ways set into the binding connection 4, also it can be heated by operation of a heating mantel or heating rings. The chamber 3 can obtain its hydrogen replenishment also from a hydrogen evolving substance, for example, lithiumhydride, this also can be used in the form of a slice or a solid body, as a thin rod. An evolving of hydrogen replenishment can be obtained by heating the evolving substance by the same heating means that heats the dividing body. The evolution of hydrogen is controlled by the electro-magnet, and the feeding of it into the light tube takes place slowly through the dividing body, so that in this case an overfeeding of the tube with hydrogen cannot take place.

The heating means can be attached to the secondary as well as to the primary of the transformers.

What we claim as new and desire to secure by Letters Patent of the United States, is:

1. In an electric discharge device, a container, electrodes for said container, a gas filling in said container, a gas supply chamber for said container, a dividing body between the gas filled container and the gas supply chamber pervious to said gas only when heated, heating means connected in series with said electrodes for heating said dividing body, and means controlled by the current flowing in said device to cut into and out of circuit said heating means.

2. In an electric discharge device, a container, electrodes for said container, a gas filling in said container, a gas supply chamber for said container, a dividing body between the gas filled container and the gas supply chamber pervious to said gas only when heated, heating means connected in series with said electrodes for heating said dividing body, and means controlled by the current flowing in said device to cut into and out of circuit said heating means at predetermined values of said current.

In witness whereof, we have hereunto set our hands this 25th day of June, 1929.

HANS EWEST.
MARCELLO PIRANI.